(12) United States Patent
Nakhasi et al.

(10) Patent No.: US 8,158,185 B2
(45) Date of Patent: Apr. 17, 2012

(54) CONTROLLED VISCOSITY OIL COMPOSITION AND METHOD OF MAKING

(75) Inventors: Dilip K. Nakhasi, Bourbonnais, IL (US); Roger L. Daniels, Manhattan, IL (US)

(73) Assignee: Bunge Oils, Inc., St. Louis, MO (US)

( * ) Notice: Subject to any disclaimer, the term of this patent is extended or adjusted under 35 U.S.C. 154(b) by 1188 days.

(21) Appl. No.: 11/867,392

(22) Filed: Oct. 4, 2007

(65) Prior Publication Data
US 2009/0092712 A1 Apr. 9, 2009

(51) Int. Cl.
*A23D 9/00* (2006.01)

(52) U.S. Cl. .................................. 426/601; 426/604

(58) Field of Classification Search ................... 426/601, 426/604
See application file for complete search history.

(56) References Cited

U.S. PATENT DOCUMENTS

| | | | |
|---|---|---|---|
| 2,614,937 A * | 10/1952 | Baur et al. .................... 426/601 |
| 2,944,908 A * | 7/1960 | Knowles et al. .................. 554/2 |
| 3,222,146 A * | 12/1965 | Case et al. ..................... 44/389 |
| 4,169,901 A * | 10/1979 | Kravis .......................... 426/601 |
| 4,188,412 A | 2/1980 | Sejpal |
| 5,156,876 A | 10/1992 | Clapp et al. |
| 5,288,550 A | 2/1994 | Sakato |
| 5,374,434 A | 12/1994 | Clapp et al. |
| 5,391,383 A | 2/1995 | Sullivan et al. |
| 5,431,719 A | 7/1995 | Clapp et al. |
| 5,434,278 A | 7/1995 | Pelloso et al. |
| 5,503,866 A * | 4/1996 | Wilhelm, Jr. .................. 426/609 |
| 5,567,456 A | 10/1996 | Clapp et al. |
| 5,662,953 A * | 9/1997 | Wheeler et al. .................... 426/2 |
| 6,123,977 A * | 9/2000 | Diamond ....................... 426/601 |
| 6,124,486 A | 9/2000 | Cherwin et al. |
| 6,793,959 B2 | 9/2004 | Nakhasi et al. |
| 6,905,722 B2 * | 6/2005 | Liu .............................. 426/609 |
| 7,037,550 B2 * | 5/2006 | Liu et al. ....................... 426/609 |
| 7,045,643 B2 | 5/2006 | Estrella de Castro et al. |
| 7,247,334 B2 | 7/2007 | Teran et al. |
| 2002/0192280 A1 | 12/2002 | Hunter et al. |
| 2003/0167681 A1 * | 9/2003 | Delgado Puche ............... 44/388 |
| 2006/0041156 A1 | 2/2006 | Casper et al. |
| 2006/0105094 A1 | 5/2006 | Holdar |
| 2006/0286213 A1 | 12/2006 | de Levita et al. |

FOREIGN PATENT DOCUMENTS

| GB | 2002806 | 2/1979 |
|---|---|---|
| WO | WO 2005/051294 | 6/2005 |

OTHER PUBLICATIONS

Rabelo, J. et al. 2000. JAOCS 77(12)1255.*
Valeri, D. et al. 1997. JAOCS 74(10)1121.*
Noureddini, H. et al. 1992. JAOCS 69(12)1189.*
Baldwin, E. A. 1997. Food Technology 51(6)56.*
Valeri, D et al. 1997. JAOCS 74(10)1221.*
Anon. 2003-2004. Supelco Chromatography Catalog. Bellefonte, PA. p. 608-609.*
Jie Su, Paul. 2004. Journal of Pharmaceutical Sciences 93(7)1755.*
Goodrum, J. W. et al. 1998. Thermochimica Acta 311:71.*
Elteman, M. et al. 1994. JAOCS 71(11)1261.*

* cited by examiner

*Primary Examiner* — Carolyn Paden
(74) *Attorney, Agent, or Firm* — Jones Day

(57) ABSTRACT

The present invention relates to a sprayable oil composition comprising a blend of an oil, an edible solvent selected from the group consisting of triacetin, tripropionin, tributyrin, and ethyl acetate; and a preferably an emulsifier such as a lecithin. Advantageously, the viscosity of the blend can be controlled without interesterification of the solvent with the oil. Furthermore, such oil compositions can be effective sprayable oils such as for pan release applications while being substantially free of alcohols.

20 Claims, 3 Drawing Sheets

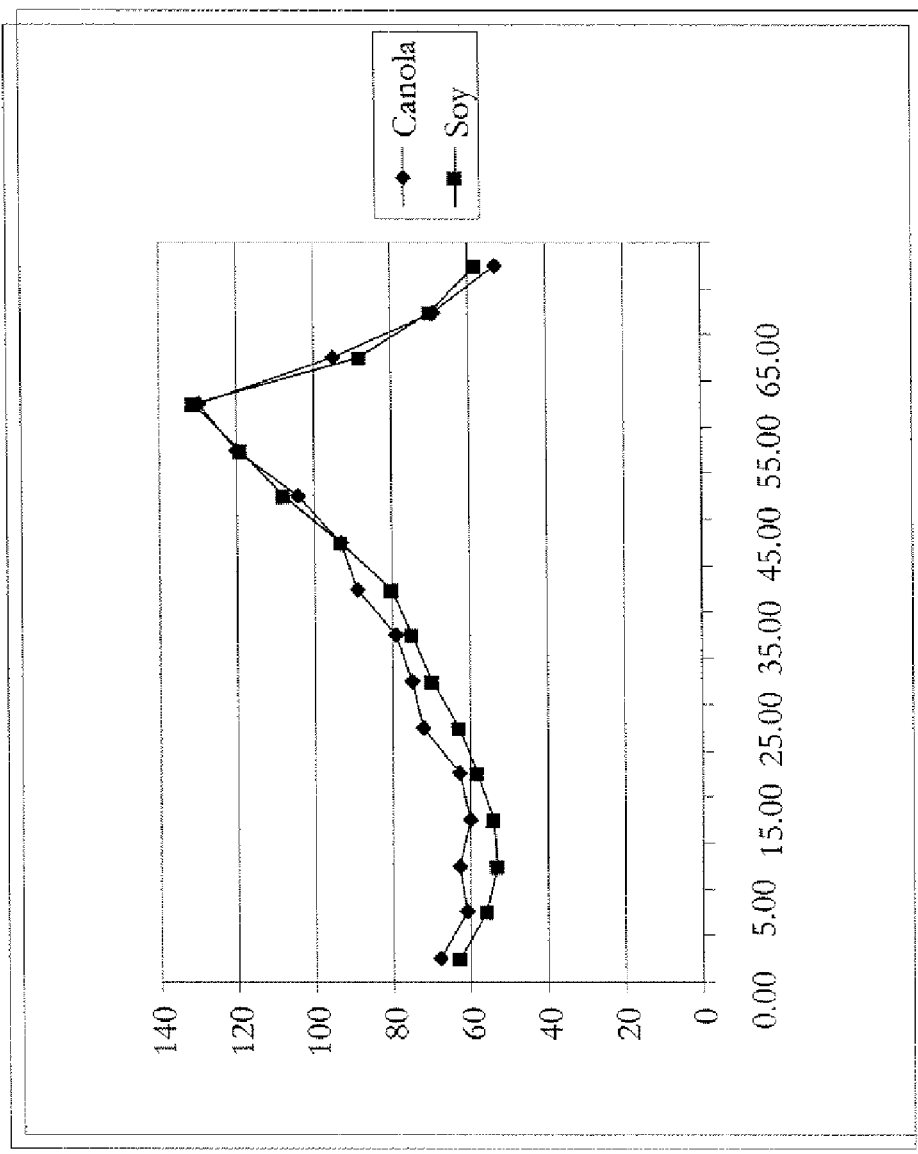
Figure 1: Triacetin Viscosities

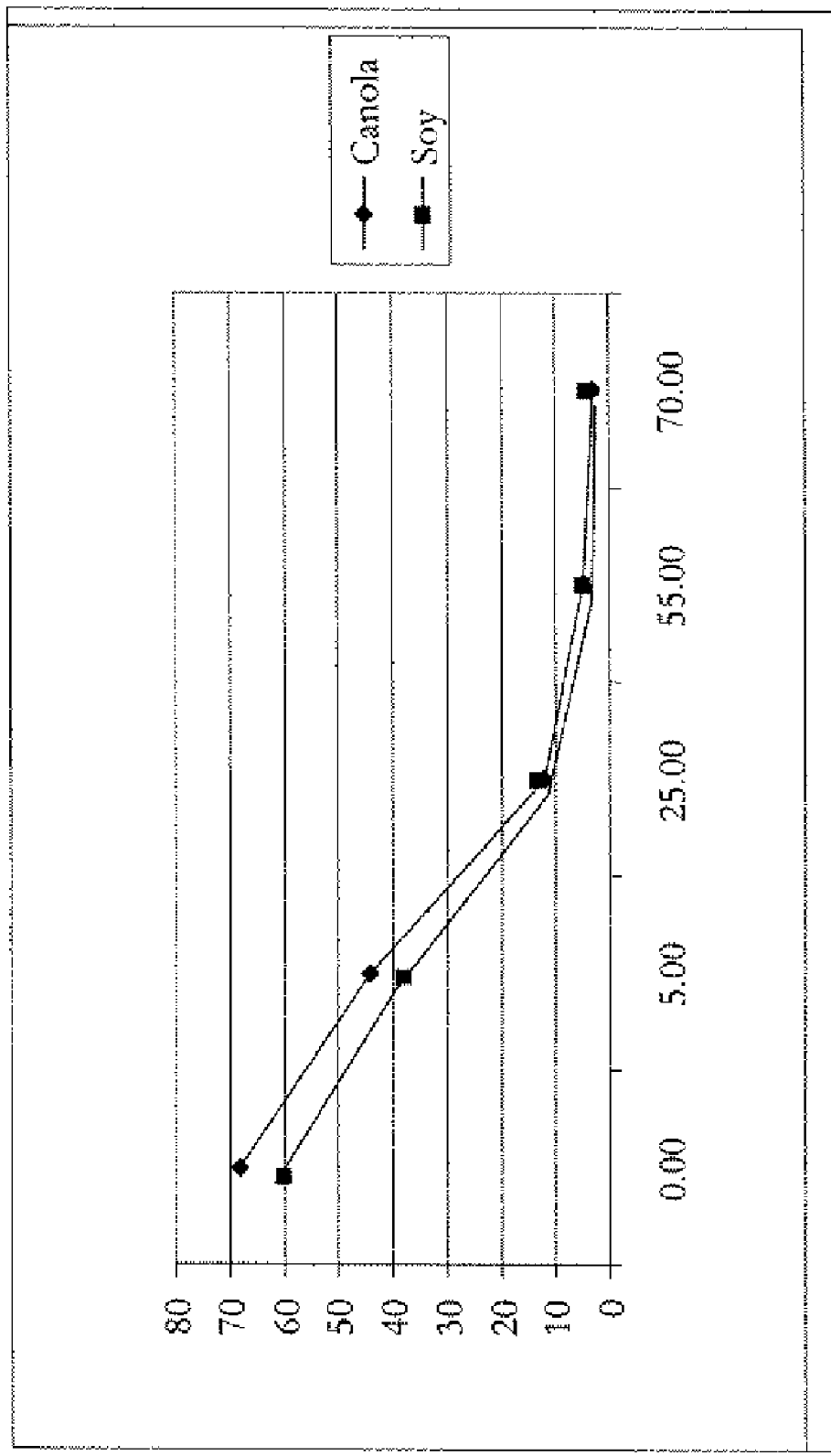
Figure 2: Ethyl Acetate Viscosities

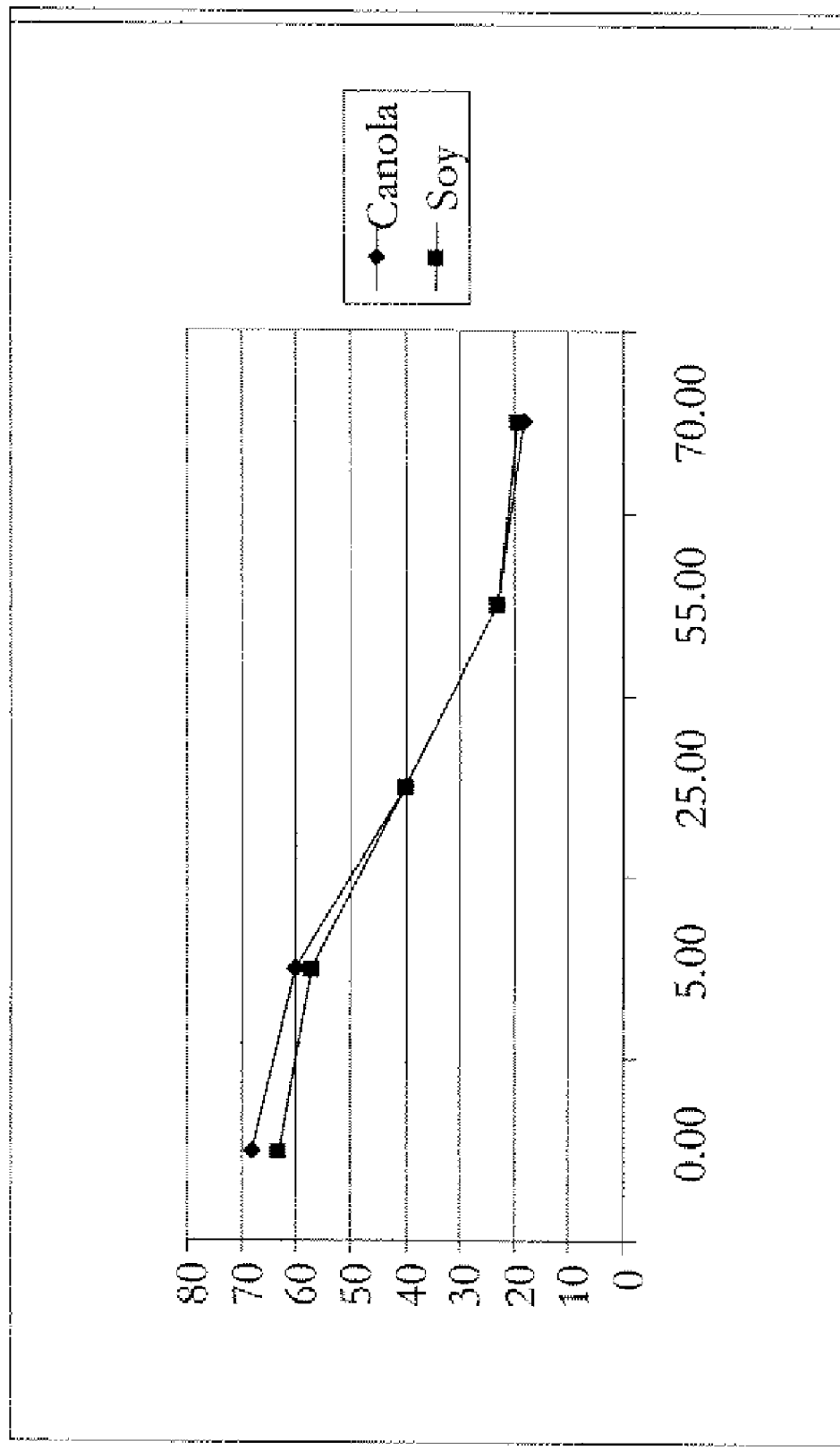
Figure 3: Tripropionin Viscosities

CONTROLLED VISCOSITY OIL COMPOSITION AND METHOD OF MAKING

BACKGROUND OF THE INVENTION

This invention relates to controlled viscosity oil compositions suitable for use in food preparation applications or in non-food applications.

Vegetable-based edible oil compositions long have been used in cooking applications. Edible oil products provide taste, nutrition and anti-stick properties for any number of pan cooking, baking or similar types of uses and applications. Edible oil products of this general type include margarines, whipped spreads, tub margarines, shortenings, oils and sprayable compositions. Room temperature viscosities of these products vary depending upon the composition and the intended end use. Some such end uses require a viscosity low enough to permit propelling of the composition by an aerosol unit, a pump assembly, or other means for dispensing in a spray or mist pattern, whether for use in home kitchens, commercial kitchens or on industrial cooking or baking lines. Products which are dispensable in these manners are referred to herein as pan release products or pan release compositions.

In the pan release art, references such as Rubin et al. U.S. Pat. No. 3,661,605 teach a surface release product in the form of an aerosol composition which is dispensed onto a cooking surface intended to be heated for food cooking purposes. This so-called pan release composition contains lecithin in a water dispersion, together with an aerosol propellant and a preservative which can be a vegetable oil and a fatty acid ester in relatively low quantities. When a typical product of this type is sprayed onto a cooking surface, the objective is to have a non-stick film of hydroxylated lecithin formed on the cooking surface. While products of this type have proven to be successful, improvements have been sought in these types of products, and this invention provides means for improving pan release products.

Spray oils are used for a variety of purposes in commercial food preparation. They can be used as cooking sprays and as bakery pan releasers. They are used in the manufacture of cereals by being sprayed directly on the cereal pieces to prevent sticking and promote the free flow of the cereals in packaging. They are sprayed on conveyor belts that handle cereal as well as other food products. They are similarly used in the manufacture of confectionary and sweet candy items. They can be applied directly to dried fruit to serve as a moisture barrier to prevent the fruit from drying further. In all such applications, it would be desirable to have sprayable edible oil compositions in which the viscosity can be adjusted to meet the needs of the particular application, and which are resistant to oxidation. In each of the foregoing applications, the viscosity of the oil is an important characteristic. In some applications, a low viscosity oil is desired where a very thin coating of oil is needed, such as on cereal products. In other applications, a higher viscosity oil is desired, for example where it is necessary that the sprayed oil not drip or run.

Sprayable oil compositions that are presently available to consumers for household cooking use typically comprise an edible oil such as canola oil, grain alcohol, lecithin, and a propellant. The presence of grain alcohol such as ethanol in such products can be undesirable for certain applications. Such alcohols can be released into the atmosphere as vaporizing fume toxins or "VFT's". The presence of such alcohols also can create challenges during shipping of the sprayable oil compositions.

Edible oil compositions also have significant non-food applications. For example, the use of bio-diesel fuels is increasing. Some bio-diesel products tend to polymerize in an engine. It would be desirable to have a less viscous bio-diesel product that would be capable of sustaining high temperatures and not build up on engine cylinders. It also would be desirable to have a cloud point suppressor for such bio-diesel products to prevent the crystallization of such products at colder temperatures. Other non-food applications are in the lubrication of conveyor belts and other machinery regardless of whether the machinery is used for food handling.

Clapp et al. U.S. Pat. No. 5,156,876, U.S. Pat. No. 5,374,434, U.S. Pat. No. 5,431,719 and U.S. Pat. No. 5,567,456 disclose food release compositions which generally require a water-in-oil emulsion including lecithin, an edible oil and an emulsifying agent. Avoiding the use of an alcohol such as grain alcohol is noted in some Clapp et al. art as being desirable. Incorporating phosphated glycerides also is noted. Standard edible oil components are taught by the Clapp et al. art.

U.S. Pat. No. 6,793,959, incorporated herein by reference, discloses a novel type of pan release component or product which incorporates interesterification technology to provide pan release products that have multiple advantageous properties which are desired for pan release applications. These include a smoke point which is adequate to perform properly in various types of cooking applications. It is often difficult to obtain an adequately high smoke point in a product which must be thin enough to be sprayable. It is also important that pan release products exhibit a lightness in color so as to not detract from the appetizing appearance of the food or the like being cooked or baked with the pan release product.

U.S. Pat. No. 7,247,334, incorporated herein by reference, discloses an oil composition in which medium chain triglyceride oils are interesterified with long chain edible oils in order to form interesterified structured lipids. These structured lipids find special application in food service pan release cooking compositions and methods. The products have a relatively low viscosity of between about 20 and about 52 centipoise while having a smoke point which is especially suitable for cooking applications. They provide enhanced release properties, reduced darkening effects, less residue build-up, and enhanced cleaning of griddling, cooking and baking pans, containers and utensils.

It is an object of the invention to provide oil compositions that can be suitable for use as pan release agents or in other cooking and food preparation applications.

It is another object of the invention to provide oil compositions that can be formulated for use in a variety of industrial or mechanical applications.

It is another object of the invention to provide a method for adjusting the viscosity of an oil composition.

It is another object of the invention to provide a sprayable oil composition suitable for use in food preparation that is substantially free of grain alcohols'.

SUMMARY OF THE INVENTION

The present invention relates to an oil composition comprising an oil blended with an edible solvent selected from the group consisting of triacetin, tripropionin, tributyrin, and ethyl acetate. We have found that, surprisingly, the viscosity of the oil can be regulated by blending in the solvent without the need for interesterification of the solvent with the oil. Moreover, we have found that the viscosity of the oil will vary with the percentage of solvent added in ways not anticipated, such that over some concentration ranges the viscosity decreases as the concentration of edible solvent increases.

This allows the oil formulator greater control of the properties of the oil composition, including dispersability and anti-polymerization.

If the oil used in the composition is non-edible, the oil composition can be used for a variety of mechanical or industrial applications.

If the oil used in the composition is an edible oil, then it has been found that the presence of the edible solvent allows for a significant amount of lecithin to be blended into the oil. The oil composition with lecithin can be used as a bakery pan release agent, a cooking agent, a food coating, and for use as a lubricant or surface treatment on food preparation and manufacturing equipment.

DESCRIPTION OF THE FIGURES

FIG. 1 is a graph of data of viscosity of triacetin/canola blends and triacetin/soy blends, showing the change in viscosity in units of centipoise on the y-axis as a function of the percentage of triacetin on the x-axis.

FIG. 2 is a graph of data of viscosity of ethyl acetate/canola oil blends and ethyl acetate/soybean oil blends, showing the change in viscosity in units of centipoise on the y-axis as a function of the percentage of ethyl acetate on the x-axis.

FIG. 3 is a graph of data of viscosity of tripropionin/canola oil blends and tripropionin/soybean oil blends, showing the change in viscosity in units of centipoise on the y-axis as a function of the percentage of tripropionin on the x-axis.

DETAILED DESCRIPTION OF THE INVENTION

In the following detailed description of the invention and in the Examples, all percentages are given on a weight basis unless otherwise stated.

In accordance with the invention, an oil composition is provided comprising a blend of an oil and an edible solvent selected from the group consisting of triacetin, tripropionin, tributyrin, and ethyl acetate. Triacetin, tripropionin, and tributyrin also are known as glycerin triacetate, glycerin tripropionate, and glycerin tributyrate, respectively. Unlike prior compositions, the compositions of the present invention are physical blends, and the oil is not interesterified with the edible solvent. Advantageously these solvents have no carbon-carbon double bonds.

In accordance with the invention, a method of making an oil composition comprises providing an oil and a solvent selected from the group consisting of triacetin, tripropionin, tributyrin, and ethyl acetate, and physically mixing them sufficiently to form a blend. The method and composition of the present invention thus are different from certain prior art methods and compositions wherein the solvent and the oil were subjected to any of various esterification procedures.

The oil can be an edible oil. Suitable edible oils include one or more of canola oil, soybean oil, corn oil, peanut oil, sunflower oil, cottonseed oil, safflower oil, palm based oils, and other edible oils known in the food manufacturing arts. Of these, canola oil and soybean oil are particularly preferred. When the oil is an edible oil, lecithin can be blended into the composition. Suitable lecithin compounds include without limitation phosphatidylserine, phosphatidylinositol, phosphatidylethanolamine, and phosphatidylcholine either alone or in combination. Other suitable phosphatidyl compounds will be recognized by those skilled in the oil formulation arts. Such phosphatidyl compounds can be used singly or in any combination, and all such compounds will be referred to herein as lecithin. In one embodiment, the lecithin can be blended into the oil composition up to about 8%.

In one embodiment, the proportion of edible solvent in the blend can be in the range of about 5-70%. In some embodiments, the presence of the edible solvent reduces the viscosity of the oil, such that the blends of the present invention will have enhanced dispersibility and anti-polymerization properties. The anti-polymerization properties of the blends allow for good performance over a broader range of operating conditions. The absence of polymerization means that the oil composition will exhibit less gumminess. The oil compositions of the present invention also have good stability and reduced quantities of build-up compared to vegetable oils that are not blended with an edible solvent. The presence of the edible solvent also will function to suppress the cloud point of the compositions.

It has been found that, surprisingly, when the solvent is triacetin, over certain concentration ranges the viscosity of the oil will increase to levels greeters than when no solvent is present. This unexpected feature allows the oil formulator to select an oil/solvent ratio that will provide the exact viscosity needed for a particular application, even if that viscosity is greater than that of the unblended oil.

Another advantage of the present invention is that oil compositions of a desired viscosity can be prepared without the addition of an alcohol. For certain applications, where desired, the oil compositions optionally can contain an amount of an alcohol. For food based uses, ethanol is a preferred alcohol.

When the oil composition is made with an edible oil, the oil composition can be used in a variety of food-based applications. The oil compositions can be packaged as a spray, and used to coat cookware such as pans for frying or sautéing, and for coating baking pans to promote the release of the foods cooked therein. The low viscosity oils also can be used to coat conveyor belts or other food handling equipment that comes in direct contact with food in the manufacturing process. The oil compositions also can be used directly on food being manufactured, such as cereals and candies, to prevent them from sticking together, or as a coating on food items to which a flavoring can adhere. The oil compositions also can be used as a moisture barrier on dried fruits and other food items that require moisture protection. All such food products prepared with the oil compositions described herein are intended to be included within the scope of the present invention. Such oil compositions also can be used as a lubricant on other machines or surfaces when a non-petroleum-based lubricant is desired. When the oil composition is made with either an edible oil or an inedible oil, it can be used as or with a biodiesel fuel, to minimize polymerization in engine cylinders, as a cloud point suppressor, and for conveyor belt and machinery applications other than in the food handling industries.

The invention may be more readily understood from the following examples. In each of the examples, the canola oil used was Nutra-Clear Oil® and the soybean oil used was sold under then name Imperial Oil, both available from Bunge Oils, Inc. The lecithin used was heat resistant soybean lecithin sold under the trademark Centrophase HR-6B available from The Solae Company and the triacetin was available under the name Triacetin Food Grade from Eastman Chemical Company. Further, in each of the Examples the viscosities were measured in units of centipoise (cp) on a Brookfield viscometer Model # RVDV–I+ and Serial # AT 55928 measured on spindle one set at 10 rpm using AOCS procedure Ja 10-87.

EXAMPLE 1

An oil composition was prepared comprising 82.00% canola, 12.00% triacetin, and 6.00% lecithin. The ingredients were mixed together at room temperature until dispersion was obtained. The composition had a viscosity of 50 cp. It is noted that experimental samples also were prepared using 62% canola and 72% canola, but these samples separated into layers after a few hours and therefore were not evaluated further.

The sample with 82% canola was decanted and dispensed into a pump spray bottle. The spray pattern was evaluated by spraying the oil on a vertical board positioned 8-10 inches from the spray nozzle. The pump spray bottle dispensability was 0.793 g/spray. A spray pattern is considered to be optimum if there is a solid film of spray at least 3.5 inches in diameter. Duplicate trials were run, as set forth in Table 1 below. The spray patterns had an elongated shape with a width of less than three inches, somewhat less than optimum. The spray pattern was more concentrated in the center, creating excess oil in one location that formed a drop and ran down the board. It is believed that the elongated shape and the excess concentration in the center of the spray pattern were due to the particular spray bottle used and not to the characteristics of the oil blend.

The sample was evaluated for its ability to release an egg that was cooked in a pan that was coated with the spray, as compared with eggs cooked in control samples of pure canola oil and pure soybean oil, each applied as a spray from the same spray bottle used for the spray pattern evaluation. The release test using the egg displayed favorable results. The first egg cooked with the canola/triacetin/lecithin spray of Example 1 needed a spatula to lightly lift the middle of the egg but otherwise completely slid out of the pan. None of the edges were stuck to the pan. The second egg cooked with a pure canola spray produced similar results but the middle as adhered to the pan a tad bit more than the first egg. The second egg still slid out of the pan with ease. The third egg cooked with a pure soy spray also needed the spatula to lift the middle of the egg but some of the sides were also stuck. Once the spatula was used to release the egg's side and middle sections it slid out of the pan. Minimal residue was observed after the release of each of the three eggs. The evaluation of the dispensability, viscosity, release, and spray pattern for this Example 1 as compared to a control sample of pure canola and a control sample of pure soy oil is set forth in Table 1.

TABLE 1

|  | Dispensability | Viscosity | Release | Spray Pattern 1 & 2 | |
|---|---|---|---|---|---|
| Example 1 | 0.793 g/spray | 50 cps | Good | 2.5"W * 4.5"L | 2.75"W * 5.0"L |
| Pure Canola | 0.88 g/spray | 68 cps | OK | 7.25"W * 5.5"L | 7.5"W * 5.5"L |
| Pure Soy | 0.833 g/spray | 63 cps | Poor | 6.0"W * 7.5"L | 6.0"W * 8"L |

EXAMPLE 2

A series of samples was prepared of triacetin blended with canola oil, and another series of samples was prepared with triacetin blended with soybean oil. In each series the percentage triacetin ranged from 0-70%. The viscosity of each sample was measured using the Brookefield viscometer procedure described above. The results are summarized in Table 2 below, and illustrated in FIG. 1.

TABLE 2

Viscosity data for blends of triacetin with canola and soy

| Triacetin Quantities | | Canola & Soy Oil Quantities | | Viscosity | |
|---|---|---|---|---|---|
| Percentages | Grams | Percentages | Grams | Canola blend | Soy blend |
| 0 | 0 | 100.00 | 350.0 g | 68 cps | 63 cps |
| 1.00 | 3.5 g | 99.00 | 346.5 g | 61 cps | 56 cps |
| 5.00 | 17.5 g | 95.00 | 332.5 g | 63 cps | 53 cps |
| 10.00 | 35 g | 90.00 | 315 g | 60 cps | 54 cps |
| 15.00 | 52.5 g | 85.00 | 297.5 g | 63 cps | 58 cps |
| 20.00 | 70 g | 80.00 | 280 g | 72 cps | 63 cps |
| 25.00 | 87.5 g | 75.00 | 262.5 g | 75 cps | 70 cps |
| 30.00 | 105 g | 70.00 | 245 g | 79 cps | 75 cps |
| 35.00 | 122.5 g | 65.00 | 227.5 g | 89 cps | 80 cps |
| 40.00 | 140 g | 60.00 | 210 g | 93 cps | 93 cps |
| 45.00 | 157.5 g | 55.00 | 192.5 g | 104 cps | 108 cps |
| 50.00 | 175 g | 50.00 | 175 g | 120 cps | 119 cps |
| 55.00 | 192.5 g | 45.00 | 157.5 g | 130 cps | 131 cps |
| 60.00 | 210 g | 40.00 | 140 g | 95 cps | 88 cps |
| 65.00 | 227.5 g | 35.00 | 122.5 g | 69 cps | 70 cps |
| 70.00 | 245 g | 30.00 | 105 g | 53 cps | 58 cps |

It may be seen from Table 2 and FIG. 1 that the viscosity of the blends initially decreased as triacetin was added, as would be expected. Surprisingly, however, it was found that at 15% triacetin for the canola blends and 10% triacetin for the soy blends, the viscosities began to increase as more triacetin was added. This result was totally unexpected, because triacetin is an edible solvent that would have been expected to reduce the viscosity of the oil blends as its proportion in the solvent-oil blend increased. At 20% triacetin, the viscosities were the same as or higher than the viscosities of the pure oils, and thereafter as more triacetin was added the viscosities increased rapidly. Further, it was found that for both the canola blends and the soy blends, at 55% triacetin the viscosities peaked and thereafter decreased rapidly, such that at 70% triacetin the viscosities were at or below the initial viscosities of the oils. It thus may be seen that blending triacetin into canola oil or soybean oil can be used as a means for adjusting the viscosity of the oil as may be desired for a particular purpose, either higher or lower than the viscosity of the pure oil, and is unexpectedly useful when a higher viscosity oil is required.

EXAMPLE 3

Each of the triacetin blends identified in Example 2 was further blended with lecithin at levels of 4%, 6% and 8%, and the viscosities of each of these samples was measured by the same procedure as in the previous examples. The results are set forth in Tables 3 and 4 below.

TABLE 3

Viscosity data for blends of triacetin/Soy/lecithin

| Triacetin | Soy | 0% Lecithin | Triacetin | Soy | 4% Lecithin |
|---|---|---|---|---|---|
| 0 | 100 | 56 | 0 | 96 | 57 |
| 1 | 99 | 56 | 0.96 | 95.04 | 61 |
| 5 | 95 | 53 | 4.8 | 91.2 | 61 |
| 10 | 90 | 54 | 9.6 | 86.4 | 58 |
| 15 | 85 | 58 | 14.4 | 81.6 | 64 |
| 20 | 80 | 63 | 19.2 | 76.8 | 69 |
| 25 | 75 | 70 | 24 | 72 | 74 |
| 30 | 70 | 75 | 28.8 | 67.2 | 83 |
| 35 | 65 | 80 | 33.8 | 62.4 | 90 |
| 40 | 60 | 93 | 38.4 | 57.6 | 99 |

TABLE 3-continued

Viscosity data for blends of triacetin/Soy/lecithin

| 45 | 55 | 108 | 43.2 | 52.8 | 120 |
| 50 | 50 | 119 | 48 | 48 | 132 |
| 55 | 45 | 131 | 52.8 | 43.2 | 124 |
| 60 | 40 | 88 | 57.6 | 38.4 | 230 |
| 65 | 35 | 70 | 62.4 | 33.6 | 350 |
| 70 | 30 | 58 | 67.2 | 28.8 | 52 |

| Triacetin | Soy | 6% Lecithin | Triacetin | Soy | 8% Lecithin |
|---|---|---|---|---|---|
| 0 | 94 | 59 | 0 | 92 | 60 |
| 0.94 | 93.06 | 63 | 0.92 | 91.08 | 65 |
| 4.7 | 89.3 | 63 | 4.6 | 87.4 | 65 |
| 9.4 | 84.6 | 62 | 9.2 | 82.8 | 65 |
| 14.1 | 79.9 | 66 | 13.8 | 78.2 | 70 |
| 18.8 | 75.2 | 73 | 18.4 | 73.6 | 77 |
| 23.5 | 70.5 | 80 | 23 | 69 | 86 |
| 28.2 | 65.8 | 92 | 27.6 | 64.4 | 100 |
| 32.9 | 61.1 | 97 | 32.2 | 59.8 | 106 |
| 37.6 | 56.4 | 116 | 36.8 | 55.2 | 124 |
| 42.3 | 51.7 | 131 | 41.4 | 50.6 | 143 |
| 47 | 47 | 144 | 46 | 46 | 156 |
| 51.7 | 42.3 | 164 | 50.6 | 41.4 | 176 |
| 56.4 | 37.6 | 314 | 55.2 | 36.8 | 409 |
| 61.1 | 32.9 | 374 | 59.8 | 32.2 | 394 |
| 65.8 | 28.2 | 66 | 64.4 | 27.6 | 68 |

TABLE 4

Viscosity data for blends of triacetin/Canola/lecithin

| Triacetin | Canola | 0% Lecithin | Triacetin | Canola | 4% Lecithin |
|---|---|---|---|---|---|
| 0 | 100 | 61 | 0 | 96 | 68 |
| 1 | 99 | 61 | 0.96 | 95.04 | 68 |
| 5 | 95 | 63 | 4.8 | 91.2 | 66 |
| 10 | 90 | 60 | 9.6 | 86.4 | 69 |
| 15 | 85 | 63 | 14.4 | 81.6 | 72 |
| 20 | 80 | 72 | 19.2 | 76.8 | 76 |
| 25 | 75 | 75 | 24 | 72 | 193 |
| 30 | 70 | 79 | 28.8 | 67.2 | 220 |
| 35 | 65 | 89 | 33.8 | 62.4 | 100 |
| 40 | 60 | 94 | 38.4 | 57.6 | 98 |
| 45 | 55 | 174 | 43.2 | 52.8 | 187 |
| 50 | 50 | 148 | 48 | 48 | 162 |
| 55 | 45 | 104 | 52.8 | 43.2 | 121 |
| 60 | 40 | 93 | 57.6 | 38.4 | 97 |
| 65 | 35 | 69 | 62.4 | 33.6 | 78 |
| 70 | 30 | 53 | 67.2 | 28.8 | 56 |

| Triacetin | Canola | 6% Lecithin | Triacetin | Canola | 8% Lecithin |
|---|---|---|---|---|---|
| 0 | 94 | 68 | 0 | 92 | 71 |
| 0.94 | 93.06 | 67 | 0.92 | 91.08 | 67 |
| 4.7 | 89.3 | 68 | 4.6 | 87.4 | 67 |
| 9.4 | 84.6 | 74 | 9.2 | 82.8 | 78 |
| 14.1 | 79.9 | 105 | 13.8 | 78.2 | 106 |
| 18.8 | 75.2 | 156 | 18.4 | 73.6 | 135 |
| 23.5 | 70.5 | 151 | 23 | 69 | 135 |
| 28.2 | 65.8 | 192 | 27.6 | 64.4 | 161 |
| 32.9 | 61.1 | 102 | 32.2 | 59.8 | 107 |
| 37.6 | 56.4 | 113 | 36.8 | 55.2 | 121 |
| 42.3 | 51.7 | 156 | 41.4 | 50.6 | 149 |
| 47 | 47 | 164 | 46 | 46 | 180 |
| 51.7 | 42.3 | 174 | 50.6 | 41.4 | 194 |
| 56.4 | 37.6 | 104 | 55.2 | 36.8 | 110 |
| 61.1 | 32.9 | 89 | 59.8 | 32.2 | 289 |
| 65.8 | 28.2 | 70 | 64.4 | 27.6 | 79 |

For each of the soy and canola blends, it may be seen that the amounts of triacetin and lecithin can have profound effects on the viscosity of the total blend, and in unexpected ways. As shown in the data in tables 3 and 4, as the concentration of lecithin in the blend is increased it has a profound effect on viscosity, particularly at higher concentrations of triacetin. This effect is particularly seen at the blends having 60-65% triacetin. This phenomena is not demonstrated in the blends without lecithin. Without being bound by theory, it is presently believed that the lecithin functions as an emulsifier, tending to maintain an emulsion of triacetin and vegetable oil, instead of in two separate layers as might otherwise occur due to the molecular weight differences.

EXAMPLE 4

Ethyl acetate and tripropionin were each evaluated as solvents in both canola oil and soybean oil. Samples were prepared at percentages of 0%, 5%, 25%, 55%, and 70% of each solvent in each oil, and the viscosities of each of the blends were measured. The viscosities for the ethyl acetate blends are set forth in Table 5, and the viscosities for the tripropionin blends are set forth in Table 6. It was observed that the viscosities consistently decreased as the amount of solvent present within the system increased. This can be observed in FIGS. 2 and 3.

TABLE 5

Viscosity data for blends of ethyl acetate with canola and soy

| Ethyl Acetate Quantities | | Canola & Soy Oil Quantities | | Viscosity | |
|---|---|---|---|---|---|
| Percentages | Grams | Percentages | Grams | Canola | Soy |
| 0 | 0 | 100.00 | 350.0 g | 68 cps | 63 cps |
| 5.00 | 17.5 g | 95.00 | 332.5 g | 44 cps | 41 cps |
| 25.00 | 87.5 g | 75.00 | 262.5 g | 12 cps | 13 cps |
| 55.00 | 192.5 g | 45.00 | 157.5 g | 5 cps | 5 cps |
| 70.00 | 245 g | 30.00 | 105 g | 3 cps | 4 cps |

TABLE 6

Viscosity data for blends of tripropionin with canola and soy

| Tripropionin Quantities | | Canola & Soy Oil Quantities | | Viscosity | |
|---|---|---|---|---|---|
| Percentages | Grams | Percentages | Grams | Canola | Soy |
| 0 | 0 | 100.00 | 350.0 g | 68 cps | 63 cps |
| 5.00 | 17.5 g | 95.00 | 332.5 g | 60 cps | 57 cps |
| 25.00 | 87.5 g | 75.00 | 262.5 g | 40 cps | 40 cps |
| 55.00 | 192.5 g | 45.00 | 157.5 g | 23 cps | 23 cps |
| 70.00 | 245 g | 30.00 | 105 g | 18 cps | 19 cps |

Dispensability was evaluated by the same method as in the previous examples. The dispensability values in the two edible solvents and the two oils are relatively similar. In all cases, as the proportion of solvent increased and the blend became less viscous, more of the sample was dispensed per spray.

With lower proportions of solvent the spray patterns of the blends tended to be narrower. The blends having 55% and 70% solvent had wider spray patterns and were more mist-like due to their lower viscosities. All of the samples also were evaluated with the same egg release test used in Example 1. It was observed that in all cases the solvents did aid in the release of the eggs, such that all the samples with solvent had better release properties than the pure canola sample or the pure soybean sample. The tripropionin blends gave off a peppery odor during the cooking process, as well as some smoke. The amount of smoke increased as the percentage of tripropionin increased. The ethyl acetate blends did not smoke and the odor that was present was the expected acetone-like smell. The evaluation data for the blends made with canola oil are set forth in Table 7, and the evaluation data for the blends made with soybean oil are set forth in Table 8.

TABLE 7

Evaluation Data Canola Blends

| | Dispensability | Viscosity | Release | Spray Pattern 1 & 2 | |
|---|---|---|---|---|---|
| Pure Canola | 0.88 g/spray | 68 cps | OK | 7.25"W * 5.5"L | 7.5"W * 5.5"L |
| Ethyl Acetate 5% | 0.726 g/spray | 44 cps | OK | 5.5"W * 6"L | 6"W * 6"L |
| Ethyl Acetate 25% | 0.833 g/spray | 12 cps | OK | 9"W * 9.5"L | 9"W * 9.5"L |
| Ethyl Acetate 55% | 0.873 g/spray | 5 cps | Good | 10.5"W * 11"L | 10.5"W * 11"L |
| Ethyl Acetate 70% | 0.82 g/spray | 3 cps | Good | 10.5"W * 11"L | 10.5"W * 11.5"L |
| Tripropionin 5% | 0.68 g/spray | 60 cps | OK | 6"W * 7"L | 6"W * 6.5"L |
| Tripropionin 25% | 0.83 g/spray | 40 cps | Good | 6.5"W * 7.5"L | 6.5"W * 8"L |
| Tripropionin 55% | 0.95 g/spray | 23 cps | OK | 10"W * 8"L | 10"W * 8"L |
| Tripropionin 70% | 0.96 g/spray | 18 cps | Good | 7.5"W * 7.5"L | 8"W * 9"L |

TABLE 8

Evaluation Data Soy Blends

| | Dispensability | Viscosity | Release | Spray Pattern 1 & 2 | |
|---|---|---|---|---|---|
| Pure Soy | 0.833 g/spray | 63 cps | Poor | 6.0"W * 7.5"L | 6.0"W * 8"L |
| Ethyl Acetate 5% | 0.893 g/spray | 41 cps | Poor | 7.5"W * 10"L | 7"W * 9.5"L |
| Ethyl Acetate 25% | 0.86 g/spray | 13 cps | OK | 9"W * 8.5"L | 8"W * 8"L |
| Ethyl Acetate 55% | 0.74 g/spray | 5 cps | Good | 10.25"W * 10.5"L | 10"W * 10.5"L |
| Ethyl Acetate 70% | 0.806 g/spray | 4 cps | Good | 11"W * 11"L | 10.5"W * 11.5"L |
| Tripropionin 5% | 0.893 g/spray | 57 cps | Poor | 7.5"W * 6.5"L | 8"W * 7"L |
| Tripropionin 25% | 0.906 g/spray | 40 cps | OK | 5.5"W * 7.5"L | 5.5"W * 7.5"L |
| Tripropionin 55% | 0.973 g/spray | 23 cps | OK | 10.5"W * 8.5"L | 10.5"W * 9"L |
| Tripropionin 70% | 0.986 g/spray | 19 cps | Good | 7.5"W * 8"L | 7.5"W * 8.5"L |

Egg release data for the canola and soybean blends are set forth in Tables 9 and 10, respectively.

TABLE 9

Egg Release Test for the Canola Blends

| Sample Type | Degree of Sticking | Comments |
|---|---|---|
| Pure Canola | 2-Light | Egg did not move, but with little help from spatula slid out. Trace residue |
| Ethyl Acetate 5% | 2-Light | Egg did not move, but with little help from spatula slid out. Trace residue |
| Ethyl Acetate 25% | 3-Slight | Egg did not move, but with little help from spatula slid out. Little residue |
| Ethyl Acetate 55% | 1-Barely | Egg did not move, but with little help from spatula slid out. Trace residue |
| Ethyl Acetate 70% | 0-None | Egg did not move, but with little help from spatula slid out. No residue |
| Tripropionin 5% | 3-Slight | Egg did not move, but with little help from spatula slid out. Little residue |
| Tripropionin 25% | 0-None | Egg did not move, but with little help from spatula slid out. No residue |
| Tripropionin 55% | 2-Light | Egg did not move, but with little help from spatula slid out. Trace residue |
| Tripropionin 70% | 0-None | Egg did not move, but with little help from spatula slid out. No residue |

TABLE 10

Egg Release Test for the Soy Blends

| Sample Type | Degree of Sticking | Comments |
|---|---|---|
| Pure Soy | 5-Severe | Egg did not move at all, had to scrape out residue |
| Ethyl Acetate 5% | 4-Moderate | Egg did not move at all, had to scrape out, light residue. |
| Ethyl Acetate 25% | 2-Light | Egg did not move, but with little help from spatula slid out. Trace residue |
| Ethyl Acetate 55% | 1-Barely | Egg did not move, but with little help from spatula slid out. Trace residue |
| Ethyl Acetate 70% | 0-None | Egg did not move, but with little help from spatula slid out. No residue |
| Tripropionin 5% | 4-Moderate | Egg did not move at all, had to scrape out, light residue. |
| Tripropionin 25% | 3-Slight | Egg did not move, but with little help from spatula slid out. Little residue |
| Tripropionin 55% | 2-Light | Egg did not move, but with little help from spatula slid out. Trace residue |
| Tripropionin 70% | 1-Barely | Egg did not move, but with little help from spatula slid out. Trace residue |

A particular advantage of the present invention is that it is possible to formulate sprayable oil composition for both food preparation and other uses wherein the oil composition is substantially free of alcohols. The compositions of the present invention have been shown to provide suitable release agents for cooking applications, even without added lecithin. It is thus possible to use the oil compositions of the present invention in situations in which it is desirable to minimize vaporizing fume toxins or VTF's.

There have been disclosed oil compositions comprising blends of oils and edible solvents, optionally with additional lecithin. The viscosities of the compositions can be controlled to be either higher or lower than the viscosity of the pure oil by the choice of edible solvent and by the amount of solvent used in the compositions. It will be appreciated that other oils can be used. In addition, one or more oils and one or more edible solvents can be used in a single composition to achieve the viscosity and performance properties desired. Those skilled in the art also will recognize that other emulsifiers can be used wither instead of or in conjunction with lecithin. Such embodiments and other equivalents are considered to be within the scope of the claims appended hereto and forming a part of the disclosure hereof.

What is claimed is:

1. A composition comprising a blend of canola oil, 15-20% triacetin and 6-8% lecithin, the composition having a viscosity greater than the viscosity of the oil alone.

2. The composition of claim 1, wherein said composition is substantially alcohol free.

3. A composition comprising a blend of an oil; triacetin; and a lecithin, wherein triacetin is present in an amount of about 15-20% and lecithin is present in an amount of about 6-8%.

4. The oil composition of claim 3, wherein said oil is an edible oil.

5. The oil composition of claim 4, wherein said edible oil is selected from one or more of the group consisting of canola oil, soybean oil, corn oil, peanut oil, sunflower oil, cottonseed oil, safflower oil and palm based oils.

6. The oil composition of claim 3, wherein said composition is substantially alcohol free.

7. The oil composition of claim 3, wherein said composition is a pan release agent.

8. The oil composition of claim 3, wherein said composition is a food coating.

9. The oil composition of claim 8, wherein said food coating is a moisture barrier.

10. The oil composition of claim 8, wherein said food coating promotes the adherence of flavorings to the surface of a food product.

11. The oil composition of claim 3, wherein said composition is a lubricant for food manufacturing equipment.

12. A sprayable oil composition comprising a blend of
 (a) an oil selected from one or more of the group consisting of canola oil, soybean oil, corn oil, peanut oil, sunflower oil, cottonseed oil, safflower oil, palm based oils;
 (b) an edible solvent selected from the group consisting of tripropionin and tributyrin, wherein the edible solvent is present in an amount from about 5 to 70% based on the total weight of the composition; and
 (c) a lecithin in up to about 8% based on the total weight of the composition.

13. The oil composition of claim 12, wherein said composition is substantially alcohol free.

14. The oil composition of claim 12, wherein said composition is a pan release agent.

15. The oil composition of claim 12, wherein said composition is a food coating.

16. The oil composition of claim 15, wherein said food coating is a moisture barrier.

17. The oil composition of claim 15 wherein said food coating promotes the adherence of flavorings to the surface of a food product.

18. The oil composition of claim 12, wherein said composition is a lubricant for food manufacturing equipment.

19. A method of making a sprayable oil composition, the method comprising the steps of providing an oil selected from the group consisting of canola oil, soybean oil, corn oil, peanut oil, sunflower oil, cottonseed oil, safflower oil and palm based oils, a solvent selected from tripropionin and tributyrin in an amount from about 5 to 70% based on the total weight of the composition, and a lecithin in up to about 8% based on the total weight of the composition, and physically mixing the oil, the solvent and lecithin sufficiently to form a blend, and wherein there is no esterification of said solvent with said oil.

20. The method of claim 19, wherein said sprayable oil composition is substantially alcohol free.

* * * * *